US012259184B2

(12) United States Patent
Kitamura et al.

(10) Patent No.: US 12,259,184 B2
(45) Date of Patent: Mar. 25, 2025

(54) METHOD OF HEATING UP FURNACE BOTTOM, AND BURNER LANCE USED IN THE METHOD

(71) Applicant: JFE Steel Corporation, Tokyo (JP)

(72) Inventors: Yohei Kitamura, Tokyo (JP); Yasukazu Hayasaka, Tokyo (JP); Katsunori Kikuchi, Tokyo (JP); Hiroki Yamaguchi, Tokyo (JP); Satoshi Maruyama, Tokyo (JP); Kouji Uchimura, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 635 days.

(21) Appl. No.: 17/441,770

(22) PCT Filed: Mar. 23, 2020

(86) PCT No.: PCT/JP2020/012587
§ 371 (c)(1),
(2) Date: Sep. 22, 2021

(87) PCT Pub. No.: WO2020/196360
PCT Pub. Date: Oct. 1, 2020

(65) Prior Publication Data
US 2022/0178612 A1 Jun. 9, 2022

(30) Foreign Application Priority Data
Mar. 27, 2019 (JP) ................................ 2019-059746

(51) Int. Cl.
*F27B 1/08* (2006.01)
*C21B 7/12* (2006.01)
(Continued)

(52) U.S. Cl.
CPC ................. *F27B 1/08* (2013.01); *C21B 7/12* (2013.01); *F23D 14/20* (2013.01); *F27B 1/00* (2013.01);
(Continued)

(58) Field of Classification Search
CPC ........................................................ F27B 1/08
See application file for complete search history.

(56) References Cited

U.S. PATENT DOCUMENTS

2010/0327498 A1 12/2010 Matsumura et al.

FOREIGN PATENT DOCUMENTS

CN 101984087 A 3/2011
CN 107124890 A 9/2017
(Continued)

OTHER PUBLICATIONS

JP-2017061716-A English translation (Year: 2017).*
(Continued)

*Primary Examiner* — Steven S Anderson, II
*Assistant Examiner* — Kurt J Wolford
(74) *Attorney, Agent, or Firm* — Buchanan Ingersoll & Rooney PC

(57) ABSTRACT

A method of heating up a furnace bottom and a burner lance used in the method are proposed. The method of heating up the furnace bottom includes a step of opening, in the tap hole, a burner lance insertion hole having a diameter larger than a diameter of the burner lance so as to penetrate into the furnace, a step of installing the burner lance in the opened burner lance insertion hole, a step of filling a gap between the installed burner lance and a furnace exterior side of the tap hole with a refractory, and a step of blowing in gas for heating into the furnace from the burner lance to heat up the furnace bottom.

7 Claims, 5 Drawing Sheets

(51) Int. Cl.

| | |
|---|---|
| ***C21C 5/46*** | (2006.01) |
| ***F23D 14/20*** | (2006.01) |
| ***F27B 1/00*** | (2006.01) |
| ***F27B 1/10*** | (2006.01) |
| ***F27D 1/00*** | (2006.01) |
| ***F27D 99/00*** | (2010.01) |

(52) U.S. Cl.

CPC ............ *F27B 1/10* (2013.01); *F27D 99/0033* (2013.01); *C21B 7/125* (2013.01); *C21C 5/4606* (2013.01); *C21C 5/4653* (2013.01); *F23D 2214/00* (2013.01); *F27D 2001/0079* (2013.01); *F27D 2099/0036* (2013.01); *F27D 2099/0038* (2013.01); *F27D 2099/0058* (2013.01); *F27D 2099/006* (2013.01)

(56) References Cited

FOREIGN PATENT DOCUMENTS

| | | | | |
|---|---|---|---|---|
| CN | 208346209 | U | | 1/2019 |
| DE | 2428642 | A1 | * | 1/1976 |
| EP | 3214187 | A1 | | 9/2017 |
| JP | 03111503 | A | | 5/1991 |
| JP | 09241710 | A | | 9/1997 |
| JP | 2009235482 | A | | 10/2009 |
| JP | 2010215940 | A | | 9/2010 |
| JP | 2016030833 | A | | 3/2016 |
| JP | 2017061716 | A | * | 3/2017 |
| JP | 2017088925 | A | | 5/2017 |
| RU | 2010109064 | A | | 9/2011 |
| SU | 1245589 | A1 | | 7/1986 |
| WO | 2009034886 | A1 | | 3/2009 |
| WO | 2014189506 | A1 | | 11/2014 |

OTHER PUBLICATIONS

DE 2428642 A1 English translation (Year: 1976).*

Oudenallen et al., “Blow-in of Blast Furnaces After Log Stops”, Stahl und Eisen, 2010, vol. 130, No. 1, 6 pages.

Extended European Search Report for European Application No. 20777620.4, dated Apr. 5, 2022, 9 pages.

International Search Report and Written Opinion for International Application No. PCT/JP2020/012587, dated Jun. 16, 2020, 5 pages.

Taiwanese Office Action for Taiwanese Application No. 109110118, dated Oct. 20, 2020, 5 pages.

Chinese Office Action with Search Report for Chinese Application No. 202080021099.7, dated Apr. 24, 2022, 23 pages.

Korean Office Action for Korean Application No. 10-2021-7028472, dated Feb. 8, 2023 with Concise Statement of Relevance of Office Action, 5 pages.

Russian Office Action with Search Report for Russian Application No. 2021130275, dated May 31, 2022, with translation, 13 pages.

* cited by examiner

METHOD OF HEATING UP FURNACE BOTTOM, AND BURNER LANCE USED IN THE METHOD

CROSS REFERENCE TO RELATED APPLICATIONS

This is the U.S. National Phase application of PCT/JP2020/012587, filed Mar. 23, 2020, which claims priority to Japanese Patent Application No. 2019-059746, filed Mar. 27, 2019, the disclosures of these applications being incorporated herein by reference in their entireties for all purposes.

FIELD OF THE INVENTION

The present invention relates to a method of heating up a furnace bottom used for heating up a content on the furnace bottom of a blast furnace and thereafter starting blast, and to a burner lance used in the method.

BACKGROUND OF THE INVENTION

A blast furnace is a facility that heats up, reduces, and melts iron ore with high temperature reduction gas generated by the reaction between high temperature air and oxygen blown from a tuyere zone and coke and pulverized coal, and produces pig iron and slag from a tap hole provided in a lower part of a tuyere. In a normal operation of the blast furnace, where the reaction heat in the furnace and the heat supply from the tuyere are balanced, a stable operation of the blast furnace is possible. However, there are cases where it is necessary to stop blast into the blast furnace, due to operation trouble and facility trouble of the blast furnace, and production adjustment. Additionally, there are also cases where it is necessary to let the blast furnace stop for a long time for repair work due to aging of the blast furnace. During the blast stoppage, the temperature of a charged material and a molten material in the furnace (hereinafter referred to as the furnace heat) falls, due to heat removal from a furnace body/a furnace bottom, suction of air from the tuyere, and the like.

When the furnace heat falls, the viscosity of slag is increased, and it becomes difficult to discharge molten pig iron slag from the tap hole provided below the tuyere level. When blast is started in such a state, the surface level of the molten pig iron slag (molten pig iron, molten slag, or a mixture of these) in the lower part of the furnace is increased by the molten pig iron and the slag generated by high temperature gas generated in front of the tuyere. There is no problem when the molten pig iron slag stagnating in the furnace bottom is heated up by the molten pig iron slag supplied from an upper part of the tuyere, and is gradually recovered to an appropriate furnace heat level. However, when the furnace heat is not recovered, the surface level of the molten pig iron slag reaches the tuyere level, and the tuyere is blocked, heat supplying means into the furnace is cut off, leading to a furnace-cooling accident, resulting in significant economic loss.

In the event of a furnace-cooling accident, even when gas is blown from the tuyere zone, which is heat supplying means to the blast furnace, a problem occurs in which the tuyere zone is blocked again with the generated molten material. As a recovery method from a furnace-cooling accident, the following method has been conventionally taken. That is, first, the tuyeres other than one or two tuyeres on the tap hole are blocked with a refractory or the like during blast stoppage, and oxygen is blown from the tap hole and the tuyeres that are not blocked. Accordingly, after discharging a half-molten material between the tap hole and the tuyeres from the tap hole, a space made in the furnace is filled with coke and thereafter blast is started. Then, after establishing the temperature rising of the furnace bottom by high temperature gas that flows between the tap hole and the tuyeres, and a smooth discharging cycle of the molten pig iron slag generated with blast, the tuyeres of an adjacent portion are opened, and the number of opened tuyeres is gradually increased to recover the usual operation, which is the method that has been taken. However, these steps are long and requires one to two months. Additionally, since blowing of oxygen or the like is manually performed, it is work with a high safety risk.

Since the furnace temperature is low at a startup after the blast stoppage, the blast furnace is exposed to a high risk of the furnace-cooling accident. To start up the blast furnace after the blast stoppage or the like without causing the furnace cooling accident, a conventional method involves increasing the coke ratio in the furnace before the blast stoppage and, without immediately blowing pulverized coal after the blast, raising the temperature (heat compensation) until pulverized coal blowing can be started. When this method is used, the charged coke ratio is reduced after confirming the stable discharging of the molten pig iron slag. Therefore, letting the blast furnace rest leads to increase in the use rate of coke, the price of which is more expensive compared with pulverized coal. Accordingly, there has been a problem that the manufacturing cost per 1 ton of molten pig iron becomes high. As another method, a method of starting blast into a blast furnace that can be started up in a short time from a long-time blast stoppage, by installing a burner in a tap hole provided in the furnace bottom of the blast furnace to burn fuel, and efficiently heating up the furnace bottom, and a burner for furnace bottom temperature rising have been proposed (Patent Literature 1).

PATENT LITERATURE

Patent Literature 1: Japanese Patent Laid-Open No. 2016-30833

SUMMARY OF THE INVENTION

However, when the burner is installed in a hole opened in the tap hole as in the above-described Patent Literature 1, there has been a problem in which a molten material cannot be completely discharged at the time of starting blast stoppage, the molten material in the furnace flows backwards to the hole opened for installing the burner, and the burner cannot be installed. Additionally, even if the burner can be installed, there has also been a problem in which the molten material flows backward into the burner before the blowing, a pipe of the burner is blocked, and the blowing cannot be performed.

Further, when the burner is inserted into the tap hole while blowing in oxygen, in consideration that a burner tip portion may be blocked, there has also been a problem in which a part of combustion gas reacted to coke in the furnace flows backward to a direction outside the furnace, the burner wears out, and combustion cannot be performed for a long time.

An object according to aspects of the present invention is to propose a method of heating up a furnace bottom that can, when heating is performed with a lance (hereinafter generally referred to as a burner lance) having a function of blowing in combustion-supporting gas for heating up a burner provided in a tap hole and the furnace bottom at the time of startup from blast furnace stoppage or the like, eliminate damage to the burner lance, and that can recover the furnace heat and the operation rate at early stage, and a burner lance used in the method are proposed.

As a result of earnest research for solving the aforementioned problems faced by the prior art, and achieving the aforementioned object, the inventors have come to develop a novel method of heating up a furnace bottom described below. That is, a first aspect of the present invention is a method of heating up a furnace bottom for heating up the furnace bottom by a burner lance provided in a tap hole of the furnace bottom of a blast furnace, the method including a step of opening, in the tap hole, a burner lance insertion hole having a diameter larger than a diameter of the burner lance so as to penetrate into the furnace, a step of installing the burner lance in the opened burner lance insertion hole, a step of filling a gap between the installed burner lance and a furnace exterior side of the tap hole with a refractory, and a step of blowing in gas for heating into the furnace from the burner lance to heat up the furnace bottom.

Additionally, a second aspect of the present invention is a method of heating up a furnace bottom for heating up the furnace bottom by a burner lance provided in a tap hole of the furnace bottom of a blast furnace, the method including a step of opening, in the tap hole, a hole larger than a diameter of the burner lance so as to penetrate into the furnace, a step of solidifying a molten material that comes out from the opened hole, a step of opening a burner lance insertion hole having a diameter larger than the diameter of the burner lance in the solidified molten material so as not to penetrate into the furnace, a step of installing the burner lance in the opened burner lance insertion hole, a step of filling a gap between the installed burner lance and a furnace exterior side of the tap hole with a refractory, a step of fusing again the solidified molten material at a burner lance tip portion, and a step of blowing in gas for heating into the furnace from the burner lance to heat up the furnace bottom.

Note that, in a third aspect of the method of heating up the furnace bottom according to the present invention configured as in the first aspect and the second aspect, it is conceivable that the following may be more preferable solutions:

(1) in the method of heating up the furnace bottom, the burner lance used for heating up the furnace bottom has a double tube structure including an inner tube and an outer tube through which gas passes, and has a cap for covering ends of the inner tube and the outer tube of the double tube structure, the cap having a structure in which, when the cap exists, gas blown in from the inner tube is discharged from the outer tube without leaking to outside, or the gas blown in from the outer tube is discharged from the inner tube without leaking to the outside, and when the cap does not exist, the gas blown in from the inner tube or the outer tube is discharged from an end of the inner tube or the outer tube to the outside of the burner lance, when the burner lance is installed in the burner lance insertion hole, and when the gap between the installed burner lance and the furnace exterior side of the tap hole is filled with the refractory, the burner lance is cooled by passing the gas from the inner tube or the outer tube in a state where the cap exists, and after the gap between the installed burner lance and the furnace exterior side of the tap hole is filled with the refractory, the cap is removed, and the gas for heating is blown into the furnace from the burner lance to heat up the furnace bottom, (2) in the method of heating up the furnace bottom, removing of the cap is performed by melting the cap with heat in the furnace, or by passing oxidizing gas from the inner tube to the outer tube to melt the cap with heat generated by oxidization of the cap. Additionally, the gas at the time of cooling of the burner lance may pass from the outer tube to the inner tube.

Further, aspects of the present invention include a burner lance used in the preferable solution, the burner lance has a double tube structure including an inner tube and an outer tube through which gas passes, the burner lance is provided with a cap for covering ends of the inner tube and the outer tube, the cap having a structure in which, when the cap exists, gas blown in from the inner tube is discharged from the outer tube without leaking to outside, or the gas blown in from the outer tube is discharged from the inner tube without leaking to the outside, and when the cap does not exist, the gas blown in from the inner tube or the outer tube is supplied to the outside of the burner lance, and the cap has a function of cooling the burner lance by passing gas through the inner tube or the outer tube in a state where the cap exists, and a function of heating up the furnace bottom by blowing in the gas for heating into the furnace from the burner lance after the cap is removed. Additionally, the burner lance may have a structure in which the gas passes from the outer tube to the inner tube.

Note that, in the burner lance according to aspects of the present invention, it is conceivable that the following may be more preferable solutions:

(1) the cap is attached to the outer tube of the burner lance with welding or screw fixation, (2) removing of the cap is performed by melting the cap with heat in the furnace, or by passing the oxidizing gas from the inner tube or the outer tube to melt the cap with heat generated by oxidization of the cap.

According to the method of heating up the furnace bottom according to aspects of the present invention, by filling the gap between the burner lance and the furnace exterior side of the tap hole with the refractory, when heating is performed with the burner lance provided in tap hole at the time of startup from the blast furnace stoppage or the like, it is possible to install the burner lance even in various situations immediately before starting blast, without damaging the burner lance. Also, by blowing in combustion-supporting gas and flammable gas or inert gas, or combustion-supporting gas from the burner lance, the recovery of the furnace heat and the operation rate at early stage are enabled. Additionally, since the blowback gas at the time of blowing in is eliminated, safe and reliable heating of the furnace bottom is possible. Further, since the certainty of the burner lance operation is increased, an operation of decreasing the coke ratio to be charged into the furnace is enabled, and it is also possible to contribute to a reduction of the molten pig iron cost.

DETAILED DESCRIPTION OF EMBODIMENTS OF THE INVENTION

Hereinafter, a method of heating up a furnace bottom according to aspects of the present invention will be described.

Figure 1:
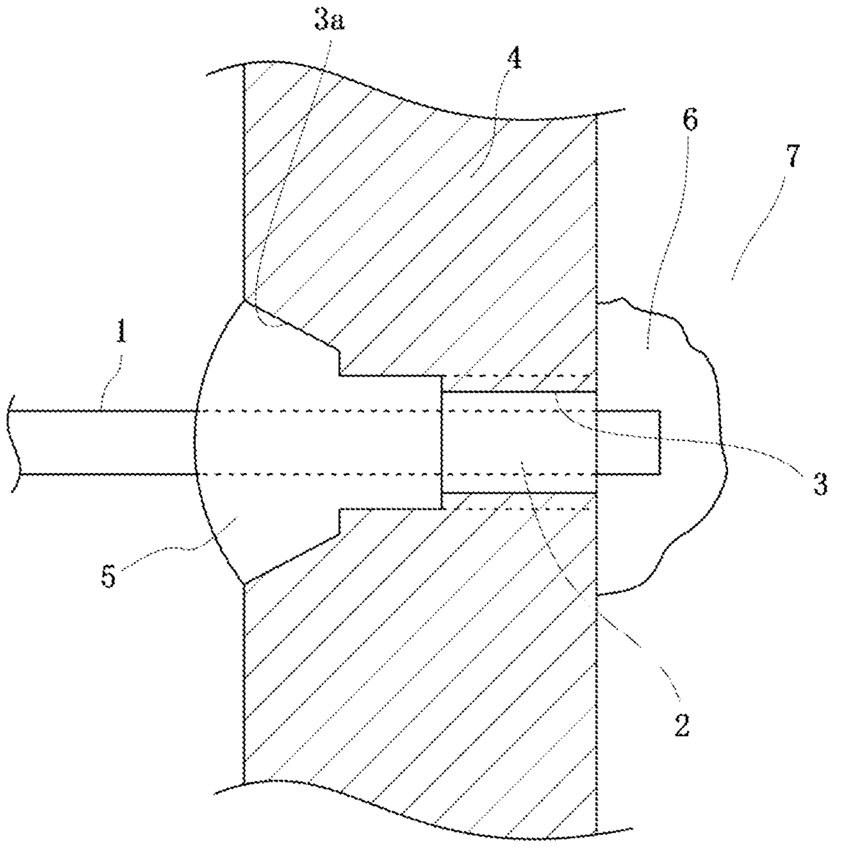
FIG. 1 is a schematic diagram for describing an example of a refractory formed in the gap between a burner lance outer surface and a furnace exterior side inner wall of a tap hole in a method of heating up a furnace bottom according to aspects of the present invention.

FIG. 1 is a schematic diagram for describing an example of a refractory formed in the gap between a burner lance outer surface and a furnace exterior side inner wall of a tap hole in the method of heating up the furnace bottom according to aspects of the present invention. In accordance with aspects of the present invention, the furnace bottom of a blast furnace refers to the portion below the tuyere height of the blast furnace, and the tap hole for discharging molten pig iron and slag is provided in the furnace bottom portion. In the example shown in FIG. 1, reference numeral 1 denotes a burner lance, and reference numeral 2 denotes a burner refractory applied to the outer surface of the burner lance 1. Additionally, reference numeral 3 denotes a tap hole provided in the furnace bottom of a furnace wall 4, and reference numeral 5 denotes a refractory formed in the gap between the burner lance 1 and an inner surface 3*a* of the tap hole 3. Further, reference numeral 6 denotes a blocking material that blocks the tap hole 3, and reference numeral 7 denotes a region where a blast furnace filling including a molten material further inside the furnace than the blocking material 6 exists. Note that, although it depends on the shape of the blast furnace, as an example, it is preferable to set the layer thickness of the refractory 5 formed in the gap between the inner surface 3*a* of the tap hole 3 and the outer surface of the burner lance 1 to be 50 mm or more in the axial direction of the burner lance 1.

In the method of heating up the furnace bottom according to aspects of the present invention, by providing the refractory 5 in the gap between the burner lance 1 and the inner surface 3*a* of the tap hole 3, when heating is performed with the burner lance 1 provided in the tap hole 3 at the time of startup from blast furnace stoppage or the like, it is possible to obtain the method of heating up the furnace bottom that can eliminate damage to the burner lance 1, and that can recover the furnace heat and the operation rate at early stage.

Hereinafter, a description will be given of a specific configuration of the method of heating up the furnace bottom of the present invention in the order of a first aspect of the present invention, a second aspect of the present invention, and the configuration of a burner lance used in aspects of the present invention and a third aspect of the present invention using the burner lance.

Figure 2:
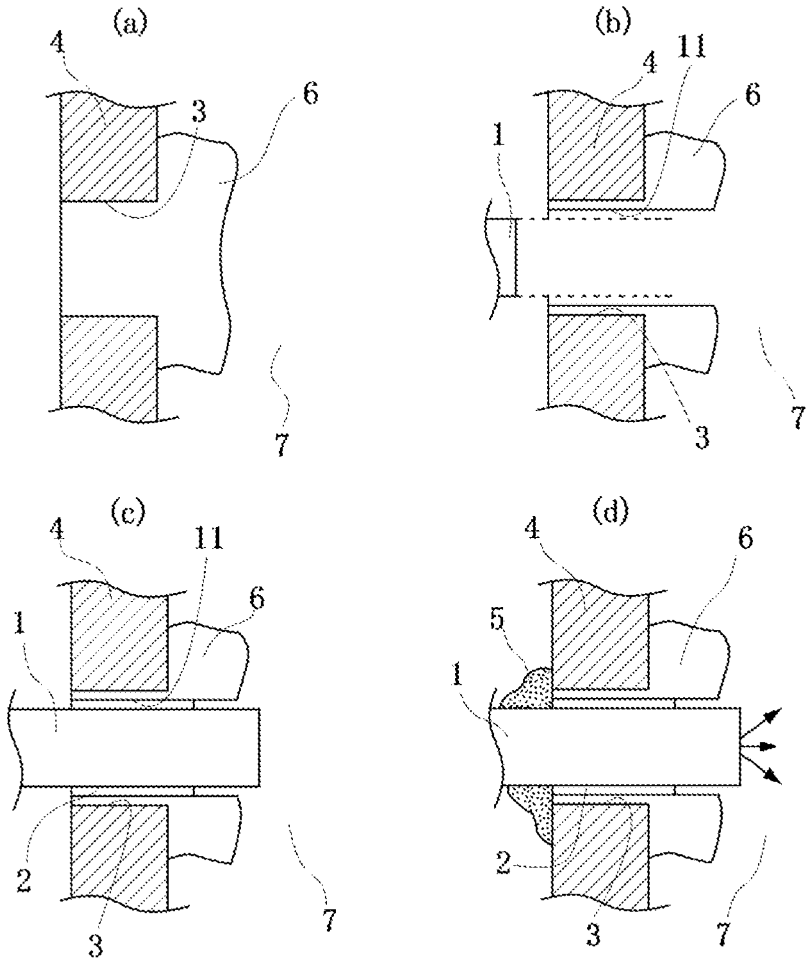
FIGS. 2 (*a*) to (*d*) are each a schematic diagram for describing each step of a first aspect of the method of heating up the furnace bottom according to aspects of the present invention.

The First Aspect of the Method of Heating Up the Furnace Bottom of the Present Invention FIGS. 2 (*a*) to (*d*) are each a schematic diagram for describing each step of the first aspect of the method of heating up the furnace bottom of the present invention. In the example shown in FIGS. 2 (*a*) to (*d*), the same reference numerals are given to the same components as shown in FIG. 1, and a description thereof will be omitted. Hereinafter, a description will be given of the first aspect of the method of heating up the furnace bottom of the present invention, according to FIGS. 2 (*a*) to (*d*).

First, in a state where the tap hole 3 is blocked by the blocking material 6 as shown in FIG. 2 (*a*), a burner lance insertion hole 11 having a diameter larger than the diameter of the burner lance 1 is opened in the tap hole 3 so as to penetrate into the furnace as shown in FIG. 2 (*b*). A known tap hole machine can be used for this opening. Next, as shown in FIG. 2 (*c*), the burner lance 1 is installed in the opened burner lance insertion hole 11. At this time, the burner lance 1 may be any kind of burner lance as long as it can maintain a flame at its tip. Finally, as shown in FIG. 2 (*d*), the gap between the installed burner lance 1 and the furnace exterior side of the tap hole 3 is filled with the refractory 5.

As an example of the refractory 5 for filling, a stamping material that is used for repairing of the tap hole 3 may be used. The refractory 5 filled from the outside is heated and hardened by a burner or the like after the filling. Then, gas for heating is blown into the furnace from the burner lance 1 to heat up the furnace bottom. As methods of blowing in gas for heating, the furnace bottom may be heated by blowing in and burning flammable gas+combustion-supporting gas from burner lance 1, or the furnace bottom may be heated by blowing in combustion-supporting gas or nitrogen gas+combustion-supporting gas from the burner lance 1, and burning coke in the furnace.

Although it is little by little, the tip of the burner lance 1 is eroded as the time of usage is increased. Accordingly, it is preferable for the tip position of the burner lance 1 to be installed at a position closer to the furnace center than an inside-furnace boundary surface (hereinafter referred to as an opening depth) of the refractory 5 formed by the blocking material 6 of the tap hole 3. When opened to the opening depth, in a case where outflow of the molten material or the like is not confirmed, and the tip position of the burner lance 1 can be installed further inside the furnace than the opening depth, a long-time blowing-in is possible merely by implementing application of the refractory 5.

Figure 3:
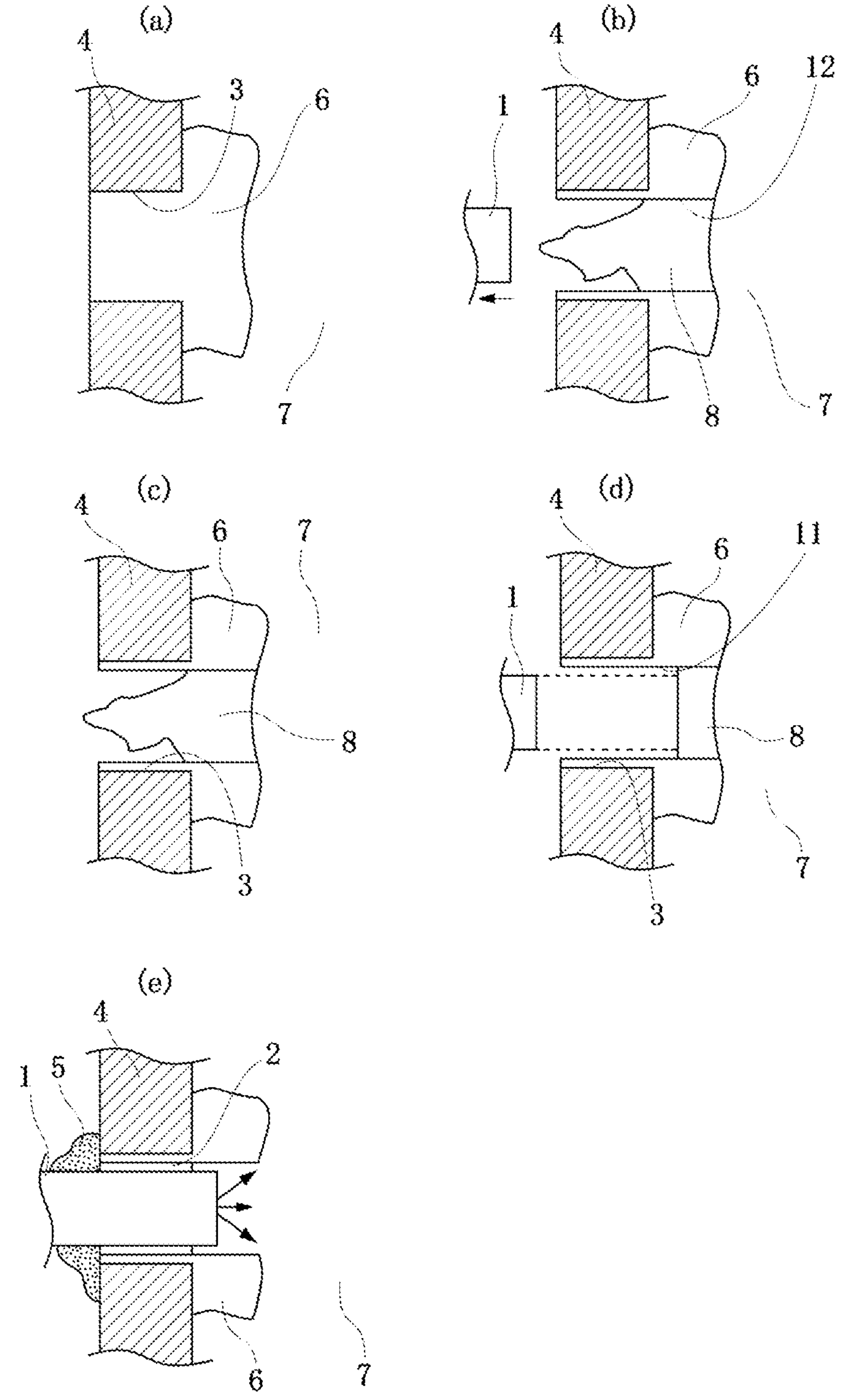
FIGS. 3 (*a*) to (*e*) are each a schematic diagram for describing each step of a second aspect of the method of heating up the furnace bottom according to aspects of the present invention.

The Second Aspect of the Method of Heating up the Furnace Bottom of the Present Invention FIGS. 3 (*a*) to (*e*) are each a schematic diagram for describing each step of the second aspect of the method of heating up the furnace bottom of the present invention. In the example shown in FIGS. 3 (*a*) to (*e*), the same reference numerals are given to the same components as shown in FIG. 1 and a description thereof will be omitted. Hereinafter, a description will be given of the second aspect of the method of heating up the furnace bottom of the present invention, according to FIGS. 3 (*a*) to (*e*).

First, in a state where the tap hole 3 is blocked by the blocking material 6 as shown in FIG. 3 (*a*), a hole 12 having a diameter larger than the diameter of the burner lance 1 is opened in the tap hole 3 so as to penetrate into the furnace as shown in FIG. 3 (*b*). The hole 12 can be opened by opening machine. At this time, as shown in FIG. 3 (*b*), when the hole 12 reaches the region 7 where the blast furnace filling exists, a molten material 8 may flow out of the furnace via the hole 12. In that case, as shown in FIG. 3 (*c*), the molten material 8 that has come out from the opened hole 12 is solidified to be used as the blocking material 6. It is preferable to perform a method of solidifying the molten material 8 by cooling the back of the hole by blowing in water, air, or both. Next, as shown in FIG. 3 (*d*), the burner lance insertion hole 11 having the diameter larger than the diameter of the burner lance 1 is opened in the solidified molten material 8 so as not to penetrate into the furnace. On this occasion, perforation may be simultaneously performed while cooling and solidifying the molten material with water or air. Next, as shown in FIG. 3 (*e*). the burner lance 1 is installed in the opened burner lance insertion hole 11. Finally, as shown in FIG. 3 (*e*), the gap between the installed burner lance 1 and the furnace exterior side of the tap hole 3 is filled with the refractory 5. Then, after the molten material 8 at the burner lance tip portion is melted with the heat in the furnace to release the burner lance tip into the furnace, for example, fuel gas is blown in from the burner lance and is burned.

In the above-described second aspect, in a case where the molten material cannot be sufficiently discharged to the outside of the furnace at the time of starting the blast stoppage, or when the molten material is generated during the blast stoppage due to air suction from a tuyere zone or the like during the blast stoppage, and the molten material level of the furnace bottom is rising, the molten material flows backwards in the tap hole at the time of the opening. In such a case, even if the opening is performed again after the molten material that has flown backwards is solidified, the molten material similarly flows backwards in the tap hole. Accordingly, it will be in a state where installation of the burner lance cannot be performed. In such a case, the installation of the burner lance is enabled by performing the opening again more shallowly than the opening depth, and blowing in water, air, or both, thereby preventing backflow of the molten material while temporarily cooling the back of the hole. In this situation, after installing the burner lance, when cooling of the molten material is stopped or mitigated, the molten material that has once solidified begins to melt again due to heat transfer from inside the furnace. When the solidified material in the vicinity of the burner lance tip portion is melted, the inside of the furnace can be heated up by igniting flammable gas that is discharged from the burner lance, or by discharging combustion-supporting gas. Alternatively, the inside of the furnace can be similarly heated up in a state where the solidified molten material is softened before being melted again, by advancing the burner lance to break the softened molten material with the burner lance, and placing the tip of the burner lance in the furnace.

Figure 4:
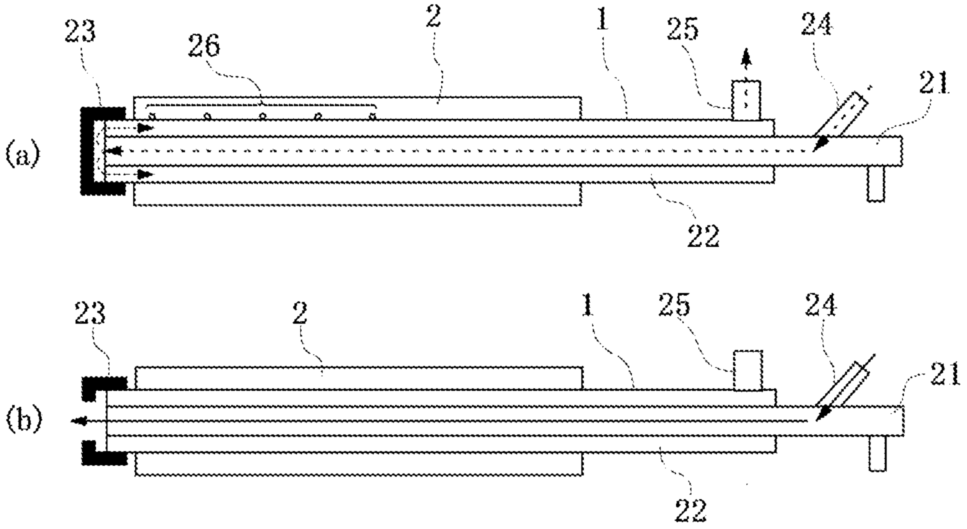
FIGS. 4 (*a*) and (*b*) are each a schematic diagram for describing the configuration of an example of a burner lance used for implementing the method of heating up the furnace bottom according to aspects of the present invention.

The Configuration of a Burner Lance Used in Aspects of the Present Invention and the Third Aspect of the Present Invention Using the Burner Lance FIGS. 4 (*a*) and (*b*) are each a schematic diagram for describing the configuration of an example of a burner lance used for implementing the method of heating up the furnace bottom according to aspects of the present invention. Additionally, FIGS. 5 (*a*) and (*b*) are schematic diagrams for describing the third aspect of the method of heating up the furnace bottom of the present invention that uses the burner lances having the configurations shown in FIGS. 4 (*a*) and (*b*), respectively. The same reference numerals are given to the same components as shown in FIG. 1, and a description thereof will be omitted. Hereinafter, the configuration of the burner lance used in accordance with aspects of the present invention will be described according to FIGS. 4 (*a*) and (*b*), and thereafter, the third aspect of the method of heating up the furnace bottom of the present invention will be described according to FIGS. 5 (*a*) and (*b*).

The burner lance 1 shown in FIGS. 4 (*a*) and (*b*) has a double tube structure with an inner tube 21 and an outer tube 22 through which gas passes, and also has a cap 23 that covers ends of the inner tube 21 and the outer tube 22. Then, when the cap 23 exists as shown in FIG. 4 (*a*), the gas blown in from a gas inlet 24 of the inner tube 21 is discharged from a gas discharging port 25 of the outer tube 22 without leaking to the outside. On the other hand, when the cap 23 does not exist as shown in FIG. 4 (*b*), the gas blown in from the gas inlet 24 of the inner tube 21 is supplied into the furnace. Therefore, the burner lance 1 has a function of cooling the burner lance 1 by passing gas from the inner tube 21 to the outer tube 22 in a state where the cap 23 exists, and a function of heating up the furnace bottom by stopping cooling by passage of the gas from the inner tube 21 to the outer tube 22 and melting and removing the cap 23, and blowing gas for heating into the furnace from the inner tube 21 of the burner lance 1.

In the present example, it is preferable for the cap 23 to be made of a metal such as cast iron whose fusing point is about 1100° C. to 1200° C. Additionally, it is preferable for the cap 23 to be attached to the outer tube of the burner lance 1 with welding or screw fixation. Further, it is preferable to perform melting of the cap 23 by melting the cap 23 with the heat in the furnace, or by passing oxidizing gas from the inner tube 21 to the outer tube 22 to melt the cap with the heat generated by oxidization of the metal forming the cap. As the method of removing the cap, in addition to the method of melting, for example, a method of destroying with impact force, a method of removing with a mechanical mechanism, or the like can be employed. Furthermore, a thermometer 26 is provided to the burner lance 1, and the amount of blowing of the gas for cooling or the gas for heating is adjusted while confirming the temperature on the thermometer 26.

Note that, in the example shown in FIGS. 4 (*a*) and (*b*), when the burner lance 1 is cooled, although the gas for cooling passes from the inner tube 21 to the outer tube 22, needless to say, the gas for cooling may pass from the outer tube 22 to the inner tube 21. Additionally, when the gas for heating is blown into the furnace, although it is blown in from the inner tube 21, needless to say, it can be blown in from the outer tube 22. In addition, when a flow channel corresponding to the inner tube and the outer tube is provided, multiple tubes with three or more tubes can also be used. Further, as the method of blowing in the gas for heating, the furnace bottom may be heated by blowing in and burning flammable gas+combustion-supporting gas from the burner lance 1, or the furnace bottom may be heated by blowing in combustion-supporting gas or nitrogen gas+combustion-supporting gas from the burner lance 1, and burning the coke in the furnace or the gas stagnating in the furnace.

Figure 5:
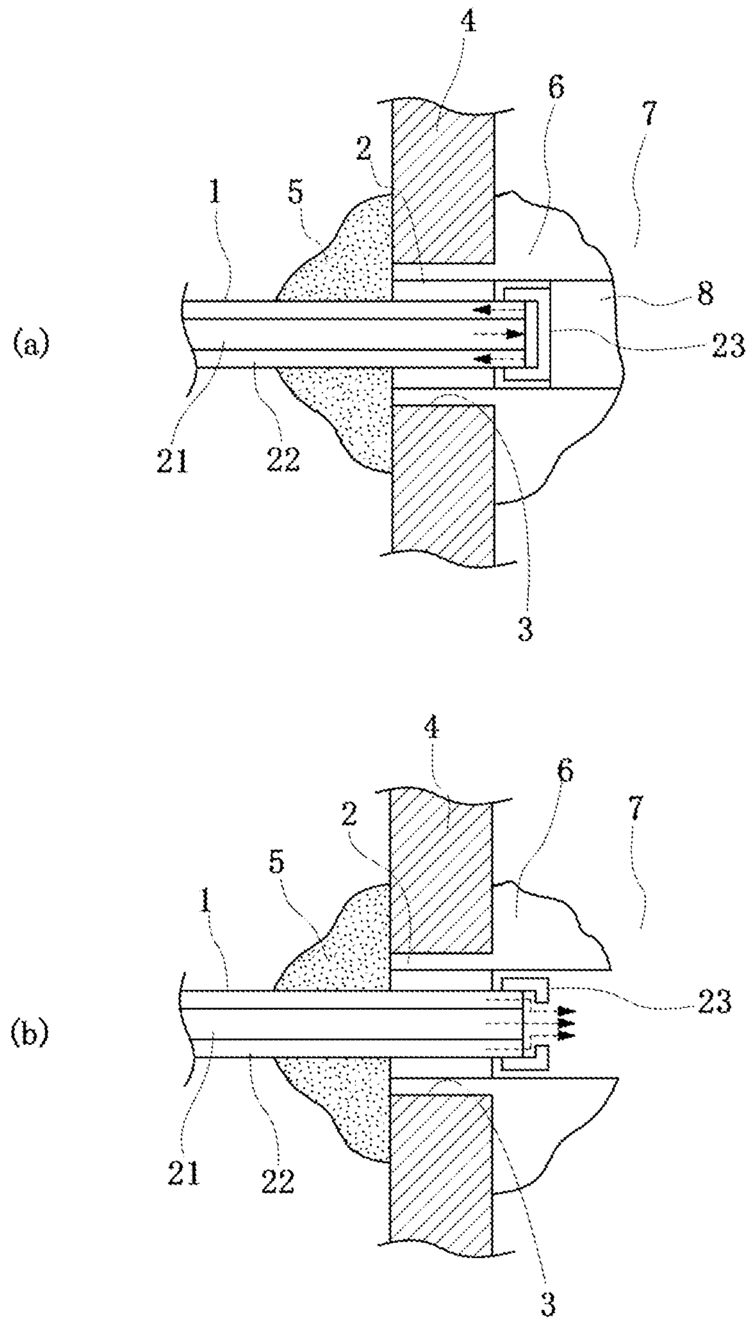
FIGS. 5 (*a*) and (*b*) are schematic diagrams for describing a third aspect of the method of heating up the furnace bottom according to aspects of the present invention that uses the burner lance having the configurations shown in FIGS. 4 (*a*) and (*b*), respectively.

FIGS. 5 (*a*) and (*b*) are each a schematic diagram for describing each step of the third aspect of the method of heating up the furnace bottom of the present invention. In the example shown in FIGS. 5 (*a*) and (*b*), the same reference numerals are given to the same components as shown in FIG. 1, and a description thereof will be omitted. Hereinafter, the third aspect of the method of heating up the furnace bottom of the present invention will be described according to FIGS. 5 (*a*) and (*b*).

In the third aspect of the method of heating up the furnace bottom of the present invention, when each step of the above-described first aspect and second aspect is implemented, the above-described burner lance 1 is utilized. That is, in the first aspect and the second aspect, when the burner lance 1 is installed in the burner lance insertion hole 11, and when the gap between the installed burner lance 1 and the furnace exterior side of the tap hole 3 is filled with the refractory 5, the burner lance 1 is cooled by passing gas from the inner tube 21 to the outer tube 22 in the state where the cap 23 exists. FIG. 5 (*a*) is a schematic diagram in a state where the burner lance of FIG. 4 (*a*) is installed in the state of FIG. 3 (*d*). Additionally, after the gap between the installed burner lance 1 and the furnace exterior side of the tap hole 3 is filled with the refractory 5, the furnace bottom is heated up by stopping the cooling by the passage of the gas from the inner tube 21 to the outer tube 22 and melting the cap 23, and by blowing in the gas for heating into the furnace from the inner tube 21 of the burner lance 1. FIG. 5 (*b*) shows a state where the cap 23 is melted and disappears with the molten material 8, and the gas for heating is being blown in. At this time, the burner lance 1 may be advanced as the inching of the molten material 8.

In the above-described method of heating up the furnace bottom according to the third aspect, it is preferable to perform the melting of the cap 23 by melting the cap 23 with the heat in the furnace, or by passing the oxidizing gas from the inner tube 21 to the outer tube 22 to melt the cap with the heat generated by oxidization of the cap 23. Additionally, also in the present example, when the burner lance 1 is cooled, although the gas for cooling passes from the inner tube 21 to the outer tube 22, needless to say, the gas for cooling may pass from the outer tube 22 to the inner tube 21. Further, when the gas for heating is blown into the furnace, although it is blown in from the inner tube 21, needless to say, it can be blown in from the outer tube 22. Further, as methods of blowing in the gas for heating, the furnace bottom may be heated by blowing in and burning flammable gas+combustion-supporting from burner lance 1, or the furnace bottom may be heated by blowing in combustion-supporting gas or nitrogen gas+combustion-supporting gas from the burner lance 1, and burning the coke in the furnace or the gas stagnating in the furnace.

After installing the burner lance in the tap hole, the tip of the burner lance is exposed to a high temperature of 1200 to 1500° C. until blowing in is started. When the tip of the burner lance is exposed to a high temperature for a long time, the tip of the burner lance will be eroded, and blowing-in of gas will not be able to be performed. When molten material remains in the furnace, molten material flows backwards inside the installed burner lance, and gas blowing in becomes impossible. In a case where the furnace bottom is heated under the condition in which the burner lance without the cap 23 is used, and the molten material flows backwards, when installation of the burner lance is performed while gas is blown in, in consideration of the blockade by the molten material, since the burner lance is eroded by the heat of the gas blown back from the tap hole, the life of the burner lance is reduced. Additionally, since it is accompanied by scattering of high temperature materials, it is also not preferable in terms of safety. It is preferable to implement the third aspect of the method of heating up the furnace bottom of the present invention as shown in FIGS. 5 (*a*) and (*b*), by using the burner lance 1 having the structure shown in FIGS. 4 (*a*) and (*b*) under the situations as described above.

Note that, when the method of heating up the furnace bottom according to aspects of the present invention is performed by the burner lance installed in the tap hole as described above, as an example, it is preferable to block with clay three tuyeres in total, i.e., a tuyere above the tap hole position, and the left and right tuyeres thereof.

EXAMPLES

Next, although an example of the present invention will be described, the condition in the example is one exemplary condition employed in order to confirm the feasibility and effects of the present invention, and the present invention is not limited to this one exemplary condition. The present invention can employ various conditions as long as they can achieve the object according to aspects of the present invention without departing from the gist of the present invention.

Comparative Example 1

At the time of startup from blast furnace stoppage, in a status where the outflow of a molten material was not confirmed after opening a tap hole, when a burner lance was installed in the tap hole, a gas of $O_2$: 130 $NM^3$/h was passed through an inner tube of the burner lance having a double tube structure, without filling the gap between the burner lance and the furnace exterior side of the tap hole with a refractory, and a gas of LNG: 55 $NM^3$/h was passed through the gap between the inner tube and an outer tube, and the burner lance was inserted in a state where the tip is being ignited, a part of flame did not enter the furnace and blew back to the outside of the furnace. Since two thermocouples at the burner lance tip of a thermometer installed in the burner lance was broken, blowing in was interrupted.

Example 1

At the time of startup from blast furnace stoppage, in the status where the outflow of the molten material was not confirmed after opening the tap hole, the burner lance was installed in the tap hole, and the refractory for tap hole repairing was applied in a stamping manner in the gap between a tap hole inner wall and a burner lance outer surface. After drying for 15 minutes, the thermometer installed in the burner lance was stable about 450° C. even after 3 h combustion under the conditions of $O_2$: 1100 $NM^3$/h and LNG: 300 $NM^3$/h, and the wear and tear of the burner lance during combustion was not confirmed.

Comparative Example 2

At the time of startup from blast furnace stoppage, after opening the tap hole, since the molten material flew backwards into the tap hole, the burner lance for heating the furnace bottom could not be installed. Although the opening was performed again in a situation where the tap hole was cooled, and the molten material was hardened in the tap hole, since the molten material flew backwards again after the opening, installation of the burner lance for heating the furnace bottom had to be abandoned.

Example 2

At the time of startup from blast furnace stoppage, after opening the tap hole, since the molten material flew backwards into the tap hole, the opening was performed again in a situation where the tap hole was cooled, and the molten material was hardened in the tap hole. The opening was performed up to the tap hole depth−50 mm, so that the tap hole does not penetrate into the furnace, and the burner lance with no cap attached to the tip was installed. After applying the refractory to the gap between the tap hole inner wall and the burner lance outer surface, when nitrogen was supplied to the burner lance, nitrogen did not flow at first and the internal pressure of the burner was increased. However, after approximately three minutes, the internal pressure fell, and it was possible to estimate that the solidified material at the tip portion of the burner lance was eroded. Thereafter, blowing in was started under the conditions of $O_2$: 1100 $NM^3/h$ and LNG: 300 $NM^3/h$, and it was possible to heat up the furnace bottom.

Example 3

However, in the method of Example 2, when it takes time to melt the solidified material at the burner lance tip portion, the time during which the burner lance is exposed to a high temperature may become long, and the burner lance tip may be deformed to cause a trouble in blowing in of gas. Additionally, there was a case where the life of the burner lance became short due to deformation of the burner lance, and blowing in could be performed only once. Therefore, heating up of the furnace bottom with the method described as the third aspect of the present invention was examined.

At the time of startup from blast furnace stoppage, after opening the tap hole, since the molten material flew backwards into the tap hole, the opening was performed again in a situation where the tap hole was cooled, and the molten material was hardened in the tap hole. The opening was performed up to the tap hole depth−50 mm, and the burner lance having the structure shown in FIG. 4 (*a*) with a cap made of cast iron at the tip was installed. At the time of installation, the burner lance was cooled by supplying compressed air through the inner tube to the outer tube of the burner lance having the double tube structure. At the time of insertion, the burner lance was pushed into the back of the tap hole with the use of a weak blow by opening machine. When the weak blow by the opening machine was intermittently applied while continuing the cooling of the burner lance, the molten material solidified in the tap hole was melted again after approximately 15 minutes, and the burner lance tip could be inserted to the vicinity of the tap hole depth. When a coolant gas for the burner lance was stopped at the position, a pressure was applied with $O_2$ from the inner tube in a state where the inside of the burner lance is sealed, and the pressure in the burner lance was observed, after approximately 5 minutes, the internal pressure rapidly changed, and reached a value equal to the internal pressure of the blast furnace. At this point, it was possible to determine that the cap at the burner lance tip portion was melted and disappeared. Blowing-in of LNG from the outer tube was immediately started, and it was confirmed that combustion could be continued under the conditions of $O_2$: 1100 $NM^3/h$ and LNG: 300 $NM^3/h$. According to this method, stable combustion became possible regardless of the state of the tap hole, and since there was no deformation of the burner lance, it was possible to perform the blowing-in multiple times.

INDUSTRIAL APPLICABILITY

According to the method of heating up the furnace bottom according to aspects of the present invention, and the burner lance used for the method, when heating is performed with the burner lance provided in the tap hole at the time of startup from the blast furnace stoppage or the like, it is possible to eliminate damage to the burner lance, and to recover the furnace heat and the operation rate at early stage, thereby providing a method of heating up the furnace bottom even for various vertical-type melting furnaces other than the blast furnace.

REFERENCE SIGNS LIST

1 burner lance
2 burner refractory
3 tap hole
3*a* inner surface
4 furnace wall
5 refractory
6 blocking material
7 region where blast furnace filling exists
8 molten material
11 burner lance insertion hole
12 hole
21 inner tube
22 outer tube
23 cap
24 gas inlet
25 gas discharging port
26 thermometer

The invention claimed is:

1. A method of heating up a furnace bottom for heating up the furnace bottom by a burner lance provided in a tap hole of the furnace bottom of a blast furnace, the method characterized by comprising:

a step of opening, in the tap hole, a hole larger than a diameter of the burner lance so as to penetrate into the furnace;

a step of solidifying a molten material that comes out from the opened hole;

a step of opening a burner lance insertion hole having a diameter larger than the diameter of the burner lance in the solidified molten material so as not to penetrate into the furnace;

a step of installing the burner lance in the opened burner lance insertion hole;

a step of filling a gap between the installed burner lance and a furnace exterior side of the tap hole with a refractory;

a step of fusing again the solidified molten material at a burner lance tip portion; and a step of blowing in gas for heating into the furnace from the burner lance to heat up the furnace bottom.

2. The method of heating up the furnace bottom according to claim 1, wherein the burner lance used for heating up the furnace bottom has a double tube structure including an inner tube and an outer tube through which gas passes, and has a cap for covering ends of the inner tube and the outer tube of the double tube structure, the cap having a structure in which, when the cap exists, gas blown in from the inner tube is discharged from the outer tube without leaking to outside, or the gas blown in from the outer tube is discharged from the inner tube without leaking to the outside, and when the cap does not exist, the gas blown in from the inner tube or the outer tube is discharged from an end of the inner tube or the outer tube to the outside of the burner lance, when the burner lance is installed in the burner lance insertion hole, and when the gap between the installed burner lance and the furnace exterior side of the tap hole is filled with the refractory, the burner lance is cooled by passing the gas from the inner tube or the outer tube in a state where the cap exists, and after the gap between the installed burner lance and the furnace exterior side of the tap hole is filled with the refractory, the cap is removed, and the gas for heating is blown into the furnace from the burner lance to heat up the furnace bottom.

3. The method of heating up the furnace bottom according to claim 2, wherein removing of the cap is performed by melting the cap with heat in the furnace, or by passing oxidizing gas from the inner tube or the outer tube to melt the cap with heat generated by oxidization of the cap.

4. A burner lance, characterized in that the burner lance has a double tube structure including an inner tube and an outer tube through which gas passes, the burner lance is provided with a cap for covering ends of the inner tube and the outer tube, the cap having a structure in which, when the cap exists, gas blown in from the inner tube is discharged from the outer tube without leaking to outside, or the gas blown in from the outer tube is discharged from the inner tube without leaking to the outside, and when the cap does not exist, the gas blown in from the inner tube or the outer tube is discharged from an end of the inner tube or the outer tube to the outside of the burner lance, wherein when the burner lance is installed in a burner lance insertion hole, and when a gap between the installed burner lance and a furnace exterior side of a tap hole is filled with a refractory, the cap has a function of cooling the burner lance by passing gas through the inner tube or the outer tube in a state where the cap exists, and after the gap between the installed burner lance and the furnace exterior side of the tap hole is filled with the refractory, the cap is configured to be removed, the cap has a function of heating up the furnace bottom by blowing in the gas for heating into the furnace from the burner lance after the cap is removed.

5. The burner lance according to claim 4, wherein the cap is attached to the outer tube of the burner lance with welding or screw fixation.

6. A burner lance, characterized in that the burner lance has a double tube structure including an inner tube and an outer tube through which gas passes, the burner lance is provided with a cap for covering ends of the inner tube and the outer tube, the cap having a structure in which, when the cap exists, gas blown in from the inner tube is discharged from the outer tube without leaking to outside, or the gas blown in from the outer tube is discharged from the inner tube without leaking to the outside, and when the cap does not exist, the gas blown in from the inner tube or the outer tube is discharged from an end of the inner tube or the outer tube to the outside of the burner lance, wherein when the burner lance is installed in a burner lance insertion hole, and when a gap between the installed burner lance and a furnace exterior side of a tap hole is filled with a refractory, the cap has a function of cooling the burner lance by passing gas through the inner tube or the outer tube in a state where the cap exists, and after the gap between the installed burner lance and the furnace exterior side of the tap hole is filled with the refractory, the cap is configured to be removed, the cap has a function of heating up the furnace bottom by blowing in the gas for heating into the furnace from the burner lance after the cap is removed, wherein the cap is removable by melting the cap with heat in the furnace, or by passing oxidizing gas from the inner tube or the outer tube to melt the cap with heat generated by oxidization of the cap.

7. The burner lance according to claim 6, wherein the cap is attached to the outer tube of the burner lance with welding or screw fixation.

* * * * *